(12) United States Patent
Luo et al.

(10) Patent No.: US 8,903,710 B2
(45) Date of Patent: Dec. 2, 2014

(54) SYNCHRO TRANSLATION VERIFICATION TEST FOR SOFTWARE APPLICATIONS

(75) Inventors: Ling Luo, Shanghai (CN); Li Qiang Qi, Shanghai (CN); Yan Min Sheng, Shanghai (CN); Wei Ji Shi, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 504 days.

(21) Appl. No.: 13/283,972

(22) Filed: Oct. 28, 2011

(65) Prior Publication Data

US 2012/0109625 A1    May 3, 2012

(30) Foreign Application Priority Data

Oct. 29, 2010  (CN) .......................... 2010 1 0532206

(51) Int. Cl.
  *G06F 17/20*  (2006.01)
  *G06F 17/28*  (2006.01)
  *G06F 17/27*  (2006.01)
  *G10L 21/00*  (2013.01)
  *G06F 17/22*  (2006.01)

(52) U.S. Cl.
  CPC ........ *G06F 17/2854* (2013.01); *G06F 17/2247* (2013.01)
  USPC ................ 704/8; 704/2; 704/4; 704/5; 704/9; 704/277

(58) Field of Classification Search
  CPC ....... G06F 17/28; G06F 17/289; G06F 17/27; G06F 17/21; G06F 17/2854; G06F 17/248; G06F 17/2735; G06F 17/275; G06F 17/2765; G06F 17/2836; G06F 17/2872; G06F 17/30401

USPC ....................... 704/2, 4, 5, 8, 9, 277
See application file for complete search history.

(56) References Cited

U.S. PATENT DOCUMENTS 6,275,790 B1 *  8/2001  Yamamoto et al. ............... 704/8
6,442,516 B1 *  8/2002  Lee et al. .......................... 704/8

(Continued)

FOREIGN PATENT DOCUMENTS

CN    101101600 A    1/2008
CN    101101602 A    1/2008
CN    101470705 A    7/2009

OTHER PUBLICATIONS

WizTom for the Windows, Whitepaper for Version 3.5, Jan. 2005, www.wizart.com, http://www.assima.net/brochures/localisation_english.pdf.*

(Continued)

*Primary Examiner* — Edgar Guerra-Erazo
(74) *Attorney, Agent, or Firm* — Cantor Colburn LLP; Terry Carroll

(57) ABSTRACT

Verifying text translation in a program including obtaining a first program integrated information (PII) file and a second PII file of text in the program. An original page is generated by using the first PII file. Document object model (DOM) tree information of the original page is obtained. For each text unit in the original page: identification information corresponding to a first text unit in the first PII file is extracted; a second text unit is identified in the second PII file using the extracted identification information and a relationship between the identification information and the second text unit; and the first text unit is replaced in the DOM tree with the second text unit. A new page is generated using the text units from the second PII file.

20 Claims, 5 Drawing Sheets

(56) References Cited

U.S. PATENT DOCUMENTS

| | | | |
|---|---|---|---|
| 6,714,939 B2* | 3/2004 | Saldanha et al. | 1/1 |
| 7,092,928 B1* | 8/2006 | Elad et al. | 706/60 |
| 7,110,938 B1* | 9/2006 | Cheng et al. | 704/5 |
| 7,143,026 B2* | 11/2006 | Challenger et al. | 704/2 |
| 7,171,352 B2* | 1/2007 | Chang et al. | 704/9 |
| 7,207,005 B2* | 4/2007 | Lakritz | 715/201 |
| 7,627,479 B2* | 12/2009 | Travieso et al. | 704/277 |
| 7,627,858 B2 | 12/2009 | Rose et al. | |
| 7,908,260 B1* | 3/2011 | Bushee | 707/705 |
| 2002/0107684 A1 | 8/2002 | Gao | |
| 2002/0123878 A1* | 9/2002 | Menke | 704/2 |
| 2002/0123879 A1* | 9/2002 | Spector | 704/2 |
| 2002/0152063 A1* | 10/2002 | Tokieda et al. | 704/2 |
| 2002/0193983 A1* | 12/2002 | Tokieda et al. | 704/2 |
| 2003/0084401 A1* | 5/2003 | Abel et al. | 715/501.1 |
| 2003/0135358 A1* | 7/2003 | Lissauer et al. | 704/2 |
| 2003/0236658 A1* | 12/2003 | Yam | 704/2 |
| 2004/0049374 A1* | 3/2004 | Breslau et al. | 704/2 |
| 2004/0128614 A1* | 7/2004 | Andrews et al. | 715/501.1 |
| 2004/0168132 A1* | 8/2004 | Travieso et al. | 715/536 |
| 2004/0237044 A1* | 11/2004 | Travieso et al. | 715/530 |
| 2005/0149315 A1* | 7/2005 | Flanagan et al. | 704/2 |
| 2007/0055739 A1* | 3/2007 | Marmor | 709/217 |
| 2008/0127103 A1 | 5/2008 | Bak | |
| 2008/0195377 A1 | 8/2008 | Kato et al. | |
| 2009/0192783 A1* | 7/2009 | Jurach et al. | 704/4 |
| 2009/0254572 A1* | 10/2009 | Redlich et al. | 707/10 |
| 2009/0327866 A1 | 12/2009 | Li et al. | |
| 2010/0088689 A1 | 4/2010 | Levi et al. | |
| 2010/0211377 A1 | 8/2010 | Aoyama et al. | |
| 2010/0250497 A1* | 9/2010 | Redlich et al. | 707/661 |

OTHER PUBLICATIONS

WizTom for the Web, Whitepaper for Version 3.5, Jan. 2005, http://www.assima.net/brochures/WizTom%20for%20the%20Web%20-%20White%20Paper.pdf.*

Chinese Office Action for Chinese Application Serial No. 201010532206.0, Mailed Nov. 22, 2013, 5 pages.

* cited by examiner

SYNCHRO TRANSLATION VERIFICATION TEST FOR SOFTWARE APPLICATIONS

PRIORITY

The present application claims priority to Chinese Patent Application No. 201010532206.0, filed on 29 Oct. 2010, and all the benefits accruing therefrom under 35 U.S.C. §119, the contents of which in its entirety are herein incorporated by reference.

BACKGROUND

The present invention relates to verifying text translation in an application program. More particularly, the present invention relates to verifying text translation in network application programs based on document object model (DOM) tree information.

With the rapid development of application programming technology and graphical user interface (GUI) technology, more and more application programs provide support for users to interact with an application program using a GUI interface. In order to meet localization requirements of application programs in various countries or regions, text in an application program shown within a GUI interface needs to be translated into multiple languages. A program integrated information (PII) file is used for storing text content of an application program shown within a GUI interface while the application program is running Examples of a PII file include, but are not limited to: property files in a Java environment, and RESX files in a Microsoft.NET environment.

Generally, a translator will realize localization of an application program by translating a PII file. However, during translation, a translator cannot see the actual GUI interface of the application program that will be presented when the program application is actually running, thus translators may make incorrect or inaccurate translations because they don't fully understand the context of the application program code. Further, since most translators are not software developers, they may not be able to correctly translate text in a PII file into proper translated text suitable for a computer program environment. For example, the English word "run" can be translated into "跑 步" (go for a run) or "运行" (operate) in Chinese, and an incorrect translation could be made unless the context of application program is understood.

Thus, translation verification tests (TVT) need to be performed in order to find and correct these potential errors in translation. There are some technical solutions for performing TVTs in the art.

One of them is known as live TVT. Using live TVT, a verifier needs a program developer to build an instance of the application program that is based on the original PII file. The verifier also needs to build an instance of a PII file for the application program that is based on a national language version (NLV) in order to perform translation and verification tasks between the two built instances. As a result, a verifier has to wait to have two instances of an application program built, thereby increasing the build resources and time consumed in waiting for verification. Furthermore, with a live TVT solution, if a verifier finds a translation error during comparison between two built instances, the verifier has to return the corrected PII file to the program developer in order for the program developer to re-build it and provide a new instance of an application program that is based on the NLV to the verifier, so that the verifier can confirm that the correction was completed. This requires both verifier and program developer resources, which will significantly influence the efficiency of completing the verification task.

There is another technical solution for performing TVT in the art: screen shot TVT. Screen shot TVT means that the verifier receives screen shots of a built instance of an original PII file and a built instance of a NLV PII file and performs verification tasks based directly on the screen shots. This will bring additional burdens to the program developer and will reduce execution efficiency of TVT because once again two instances of the application program have to be built, and screen shots are taken of the GUI interface for both instances.

SUMMARY

According to exemplary embodiments, a method, system, and computer program product for verifying text translation in a program. The verifying includes obtaining a first program integrated information (PII) file and a second PII file of text in the program. An original page is generated by executing the program using the first PII file. Document object model (DOM) tree information of the original page is obtained. For each text unit in the original page: identification information corresponding to a first text unit in the first PII file from the DOM tree information is extracted; a second unit corresponding to the first text unit text unit is looked up in the second PII file, the second text unit is identified in the second PII file using the extracted identification information and a correspondence relationship between the identification information and the second text unit; and the first text unit in the DOM tree information is replaced with the second text unit. Once all of the first text units have been replaced, a new page is generated with each of the text units in the original page replaced by corresponding text units in the second PII file.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing, and other features and advantages of the invention are apparent from the following detailed description taken in conjunction with the accompanying drawings in which:

DETAILED DESCRIPTION

Embodiments described herein provide a technical solution such that translation text verification (TVT) may be performed by building only a single instance of an application program, thereby reducing waiting time during verification and improving efficiency. In addition, embodiments described herein provide a technical solution that is able to reflect modifications made to a program integrated information (PII) file during verification in real-time without waiting to re-build an instance of the application program.

Figure 1:
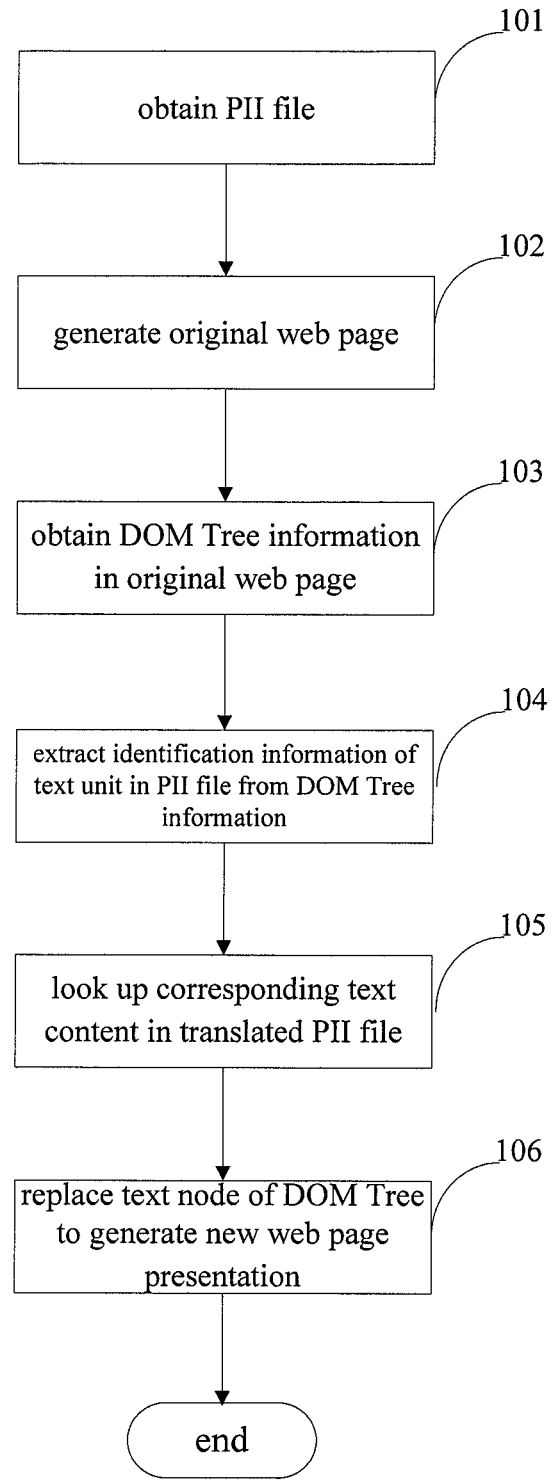
FIG. 1 depicts a process flow of a method for verifying text translation in a program according to one embodiment of the invention.

FIG. 1 shows a process flow of a method for verifying text translation in a program according to one embodiment of the invention. In block 101, an original PII file and a translated PII file of text in an application program are obtained. In order to meet localization requirements of the application program in various countries or regions, text presented to a user on a user interface during runtime (also referred to herein as "during execution") needs to be translated. In an embodiment, the text is stored in a PII file by a developer during the program development process. Under different programming environments, PII files typically have particular names or fixed formats. For example, in a Java® environment, a PII file is embodied as a property file, its format is "key=text characters", where "key" represents a key in the property file, and "text characters" is the value of that key (i.e. a key value pair). In a Windows® environment, a PII file is generally embodied as a resource file (RESX). Regardless of which programming environment is used, the content of a PII file may be construed as a file that includes multiple rows of text characters, where each row of text characters corresponds to the text of the application program to be displayed in particular places in a user interface at runtime. It should be noted that the term "original PII file" refers to a PII file of a program version initially developed by program developers in their native language. For example, a program developer whose native language is English, while developing an application program, will usually make the application program display English text to users during runtime. In this case, the original PII file is just the English PII file. The "translated PII file" refers to a PII file formed by translating the text content in an original PII file by a translator. In an embodiment, when the translator translates text content to be displayed on the user interface, the translation is performed directly in the PII file. That is, corresponding to each row of an original PII file, a translator directly replaces text in the original language with text translated into an object language to form a new PII file without changing the row numbers and structure of the PII file.

At block 102, the original PII file of text in the program is run, or executed, to generate an original page. That is, the original PII file is imported as text content to be displayed to a user when running (also referred to therein as "executing") the application program. A page is a source page of instructions for rendering a user interface at a recipient (i.e. a web browser). In an embodiment, the page is a hypertext markup language (HTML) source page. In an additional embodiment, a page may be a combination of text and/or images rendered and displayed in a web browser. In an embodiment, one or more pages are transmitted over the Internet from a webserver to a browser executing on a client computer system. In an additional embodiment, a page is transmitted over a local network (e.g. an Intranet) from a web server to a web browser executing on a client computer. In other embodiments, one or more pages are loaded to a browser from a file on the local client computer, or over a network from, for example, a file server. If the application program is a network program or a program interacting with a user in the form of a page, then the application program will display text content to a user through the page when the application program is running, or executing.

At block 103, a document object model (DOM) tree of the original page is obtained. The page's HTML source code (or other page source code language) includes a plurality of nodes, and all these nodes may be classified as either primary nodes, or child nodes (i.e., labels in HTML code). A DOM tree is a tree-shaped structure of information from the nodes of the page's source code. Specifically, a page's HTML structure is parsed by a browser, objects corresponding to each of the nodes of the entire document are created in memory, and then starting from the first node in the document, the nodes are intercepted one by one according to a hierarchy of the HTML. After the page is loaded into memory, a node object tree-shape structure is formed in accordance with the HTML structure. The above description is provided for purposes of clarity, and it will be understood by those skilled in the art, that other methods for creating a DOM tree of information of the page may be used.

At block 104, identification information corresponding to a text unit in the original PII file is extracted from the obtained DOM tree information. A text unit is a base unit constituting the text in a PII file. As described above, each row of text characters in the PII file corresponds to text on the GUI of the application program, and is displayed on the user interface at runtime. Therefore, a text unit is a row of text in the PII file. Of course, here "row" not only means a traditional "row" separated by a line break, since a PII file may have different structures in different programming environments. A base unit or row constituting text therein may be identified in various manners, such as a key in a Java environment. Since text content in an original PII file is included in the generated original page during the running of the application program (i.e., in HTML source code of the original page), the text content is included in the DOM tree information for the source page. Thus, the text content at each place in the DOM tree information corresponds to each row of text in the original PII file. Next, "identification information" will be described. Identification information is contained in the original PII file and corresponds to each text unit therein. According to an embodiment of the invention, identification information is an identifier ("ID") that is added to each text unit of the original PII file in order to identify each individual text unit. According to another embodiment of the invention, identification information is any character, or character string, added corresponding to each text unit of the original PII file, and is used for identifying the text unit. According to one embodiment of the invention, identification information is invisible to a user of the page generated after the program is run. According to an alternate embodiment of the invention, identification information is visible to a user of a page generated after the program is run. According to one embodiment of the invention, identification information of each text unit in an original PII file is different (i.e. unique). Since identification information exists in an original PII file (corresponding to each text unit of the original PII file), the identification information constitutes part of the text content of the original PII file. The identification information is therefore included in the DOM tree information of the source page. Therefore, identification information in the DOM tree corresponding to each row of text (or text unit) in the original PII file may be obtained.

It should also be noted that, according to an embodiment of the invention, identification information is automatically added for each text unit of the original PII file before the verification task. Various methods may be used to implement the addition of the identification information automatically. If the PII file has N text units, then N pieces of different identification information (ID or other character) are generated and added automatically. Detailed methods regarding addition of identification information will be described below in conjunction with the description of FIG. 2. According to an embodiment, identification information is not added to the translated PII file, and the corresponding text content needs to be looked up in the translated PII file by using other identification information (such as the name of a key in a PII file in the Java® environment) that exists in the PII file itself (e.g., see description of block 105). According to another embodiment of the invention, identification information is automatically added for each text unit in the original PII file, and the translated PII file after translation and before verification. The identification information added to the original PII file and the translated PII file is the same (a set of identification information is applied to each of the two PII files). According to an embodiment, the translated PII file contains the same identification information as in the original PII file, therefore the translated text content can be looked up in the translated PII file directly through the added identification information (e.g., see description of block 105). It will be understood that adding identification information is not a necessary step of embodiments of the invention, and that the purpose of embodiments of the invention is achieved as long as such identification information exists and such identification information can be obtained.

At block 105, a corresponding text unit in the translated PII file is looked up according to the extracted identification information and correspondence relationship between the identification information and the text unit of the original PII file.

According to an embodiment of the invention, if the identification information is added in both the original PII file and the translated PII file, then a correspondence relationship exists between identification information and text units in the translated PII file. Thus, corresponding translated text content can be directly looked up in the translated PII file obtained in block 101 through identification information and the correspondence relationship. It is noted that, although what is described above with respect to block 105 is looking up a corresponding text unit according to the extracted identification information and correspondence relationship between the identification information and the text unit of original PII file, those skilled in the art will understand that, in this embodiment, such correspondence relationship is directly embodied as a correspondence relationship between the identification information and the text unit of the translated PII file. This is because the text unit of any original PII file corresponds to that of the translated PII file one-to-one, and this correspondence relationship may also be construed as the correspondence relationship described above with reference to block 105.

According to another embodiment of the invention, if identification information is only added to the original PII file, then the correspondence relationship includes a corresponding relationship between the identification information and the text unit in the original PII file. Thus, the key name of the text unit in the original PII file corresponding to the identification information needs to be looked up using the identification information and the content of the corresponding translated text unit is looked up in the translated PII file by using a key name. Of course, "key name" is merely an example in a Java® environment, and in other different programming environments, those skilled in the art can look up text unit according to a distinguishing property name in the PII file in that environment.

Similarly to adding identification information, recording correspondence relationships between identification information and a text unit is not a necessary step of embodiments of the invention. One of ordinary skill in the art would understand that the purpose of embodiments of the invention can be achieved as long as such correspondence relationship exists and such correspondence relationship can be obtained.

At block 106, a corresponding text unit in the DOM tree information is replaced with the looked-up text unit in the translated PII file to generate a new page presentation in accordance with the translated PII file. After the text unit is replaced, a new set of DOM tree information is generated. That is, a new HTML source code is generated from the DOM tree information. Thus, it is possible to utilize an existing browser to parse the generated new HTML source code, which will generate a new page presentation using the translated PII file. According to one embodiment of the invention, the new page presentation is located in the same browser label as the original page. According to another embodiment of the invention, the new page presentation is located in a different browser label than the original page (i.e., in different pages).

Using the method shown in FIG. 1, the page presentation in accordance with the original PII file and the translated PII file is automatically provided to a verifier by only building one instance of an application program, which significantly reduces waiting time during verification and improves efficiency. As described herein, the text unit in the PII file is located by means of identification information in the PII file and the DOM tree information of the page is been utilized to replace text content therein.

According to another embodiment of the invention, the original PII file and the translated PII file are replaced. That is, at block 102, the original PII file of text in the program is executed to generate the original page. At block 103, the DOM tree information of the original page is obtained. At block 104, identification information corresponding to a text unit in the translated PII file is extracted from the obtained DOM tree information. At block 105, a corresponding text unit in the original PII file is looked up according to the extracted identification information and the correspondence relationship between the identification information and text unit of the translated PII file. At block 106, the corresponding text unit in the DOM tree information is replaced with the looked-up text unit in the original PII file to generate a new page presentation representing the original PII file. Accordingly, the above replacement may also be made in other descriptions regarding a detailed embodiment of each block. The above embodiment also achieves the purpose of embodiments of the present invention because, whether the process starts from original PII file or translated PII file, the page presentation for both of the PII files is generated using only one instance of the application program, and the verifier needs only one page presentation of these two PII files.

Figure 2:
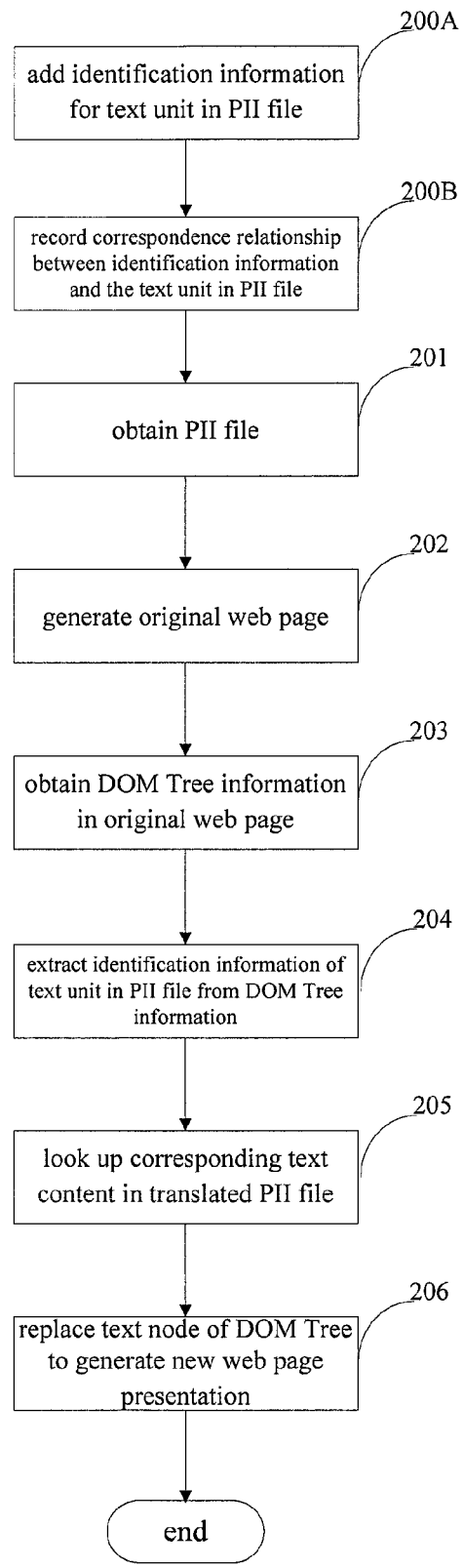
FIG. 2 depicts a process flow of a method for verifying text translation in a program according to another embodiment of the invention.

FIG. 2 depicts a process flow of a method for verifying text translation in a program according to another embodiment of the invention. At block 200A, identification information is added for a text unit in the first PII file of text in a program. According to an embodiment of the invention, the identification information is an ID or character string such as A, B, C or 990, 991, 992, and the identification information is visible to a user of a page when the program is executed. According to another embodiment of the invention, the identification information is one or more characters such as U+200B, U+200C or U+200D represented in Unicode and is invisible in the user interface GUI, in order to avoid influencing a user's experience of viewing the program interface with identification information.

At block 200B, a correspondence relationship between the added identification information and the text unit in the first PII file is recorded. According to one embodiment of the invention, this correspondence relationship may be recorded in a local intermediate file by using a mapping table, and the recorded correspondence relationship may be obtained by importing that intermediate file. According to another embodiment of the invention, the correspondence relationship is recorded at a remote server such that program developers or verifiers at different locations may easily obtain the correspondence relationship information. The two examples provided herein are for purposes of clarity, and it will be understood that various formats for recording correspondence relationship may be used.

Blocks 201-206 shown in FIG. 2 may be construed as corresponding to blocks 101-106 shown in FIG. 1, and the description of which will be omitted here for brevity.

Further, the method shown in FIG. 2 may also comprise the following processes not shown in FIG. 2. A node property changing event is triggered when information in the DOM tree is changed, the original page intercepts the event; and the page presentation of the second PII file is updated according to the node property changing information transmitted with the event. The purpose of the listening and updating is to enable the program developer to provide feedback of the new information to a verifier more quickly when the program developer has modified the property of the text in the PII file. A node property may include the text content, and the width, color, and font of the text displayed on a page, etc. By using the event model, a modification made to PII file during verification by a program developer can be reflected in real time without waiting to rebuild the instance of the application program.

The following is an example of providing a page presentation regarding two PII files in a case where only one instance of a program is built by using methods such as those shown in FIG. 1 and FIG. 2.

Assume that file name of the original PII file of an application program is msg.properties, and its content is as follows:

```
MSG.HELLO = Hello, buddies!
MSG.WELCOME = Welcome!
```

There are two text units in this PII file. MSG.HELLO and MSG.WELCOME are key names of two "keys" in this original PII file, i.e., names of two text units in the PII file. The character strings "Hello, buddies!" and "Welcome!" after the symbol "=" are text content of the two text units.

Next, one instance of the application program regarding the original PII file is built, and the following DOM tree information of a page is obtained (page actually displayed is not shown):

```
DOM Tree
<HTML>
    <Head>
    </Head>
    <Body>
        <div id="content">
            <div>Hello, buddies!</div>
            <div>Welcome!</div>
        </div>
    </Body>
</HTML>
```

Next, identification information is added for each text unit in the original PII file, wherein, U+200D represents "1", U+200C represents "0", and U+200B represents the beginning and ending of a text unit in the PII file. The PII file to which identification information has been added is as follows:

```
MSG.HELLO = U+200BHello, buddies!U+200BU+200C
MSG.WELCOME = U+200BWelcome!U+200BU+200D
```

Thus, the DOM tree information of the page generated from building an instance of the original PII file of the application program to which identification information has been added is as follows:

```
<HTML>
    <Head>
    </Head>
    <Body>
        <div id="content">
            <div>U+200BHello, buddies!U+200BU+200C</div>
            <div>U+200BWelcome!U+200BU+200D</div>
        </div>
    </Body>
</HTML>
```

It can be seen that the added identification information is embodied as DOM tree information. Assume that a correspondence relationship between the added identification information and text unit in the PII file is recorded in the following intermediate file, and content of the file includes:

```
U+200C = "msg.properties" | MSG.HELLO
U+200D = "msg.properties" | MSG.WELCOME
```

The content of the translated PII file named msg_zh.properties is as follows:

```
MSG.HELLO = 嗨, 大伙儿!
MSG.WELCOME = 欢迎!
```

Then, after the identification information of the text node in the DOM tree of the original PII file is extracted, two corresponding key names are obtained by looking up the above intermediate file. Corresponding Chinese text is found in the translated PII file by using these two key names, and text content in the DOM tree is replaced with Chinese text, such that the following new DOM tree information is obtained:

```
<HTML>
    <Head>
    </Head>
    <Body>
        <div id="content">
            <div>嗨, 大伙儿! </div>
            <div>欢迎 !</div>
        </div>
    </Body>
</HTML>
```

The new page presentation corresponding to the translated PII file can be obtained by parsing the newly generated DOM tree with a browser.

Figure 3:
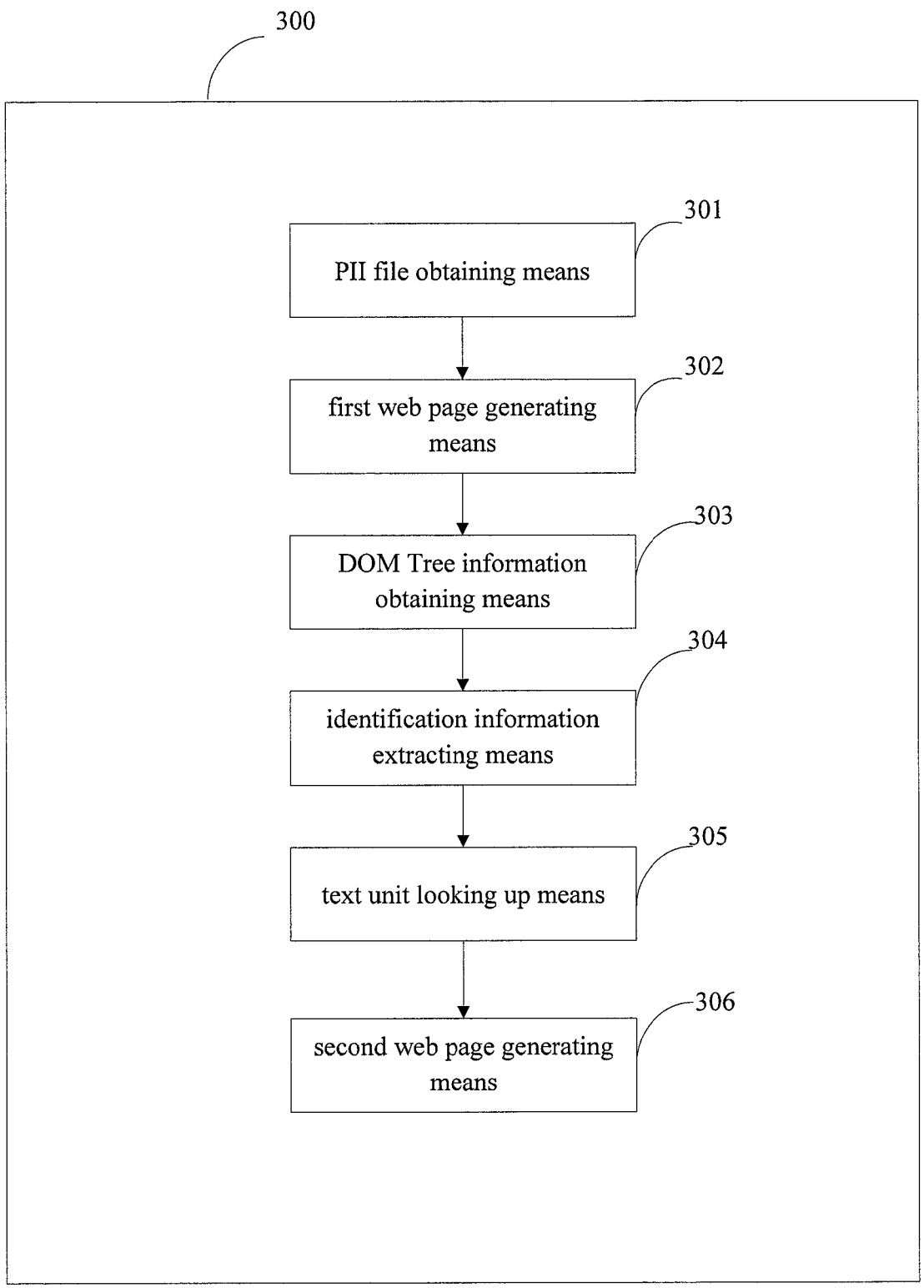
FIG. 3 depicts a schematic diagram of a system for verifying text translation in a program according to one embodiment of the invention.

FIG. 3 depicts a schematic diagram of a system for verifying text translation in an application program according to one embodiment of the invention. The system shown in FIG. 3 is represented by system 300. Specifically, the system 300 comprises a PII file obtaining means 301 for obtaining a first PII file and a second PII file of the text in the program. The system 300 further includes a first page generating means 302 for executing the program based on the first PII file to generate an original page. The system 300 further includes a DOM tree information obtaining means 303 for obtaining DOM tree information of the original page. The system 300 additionally includes an identification information extracting means 304 for extracting identification information corresponding to text units in the first PII file from the DOM tree information. The system 300 further includes a looking up means 305 for looking up corresponding text units in the second PII file according to the extracted identification information and the correspondence relationship between the identification information and the text unit. The system 300 further includes a second page generating means 306 for replacing the corresponding text unit in the DOM tree information with the looked-up text unit in the second PII file and for generating a new page representation corresponding to the second PII file. Those of ordinary skill in the art will recognize that, means 301-306 in the system 300 correspond to means for performing blocks 101-106 in the method shown in FIG. 1 respectively.

Figure 4:
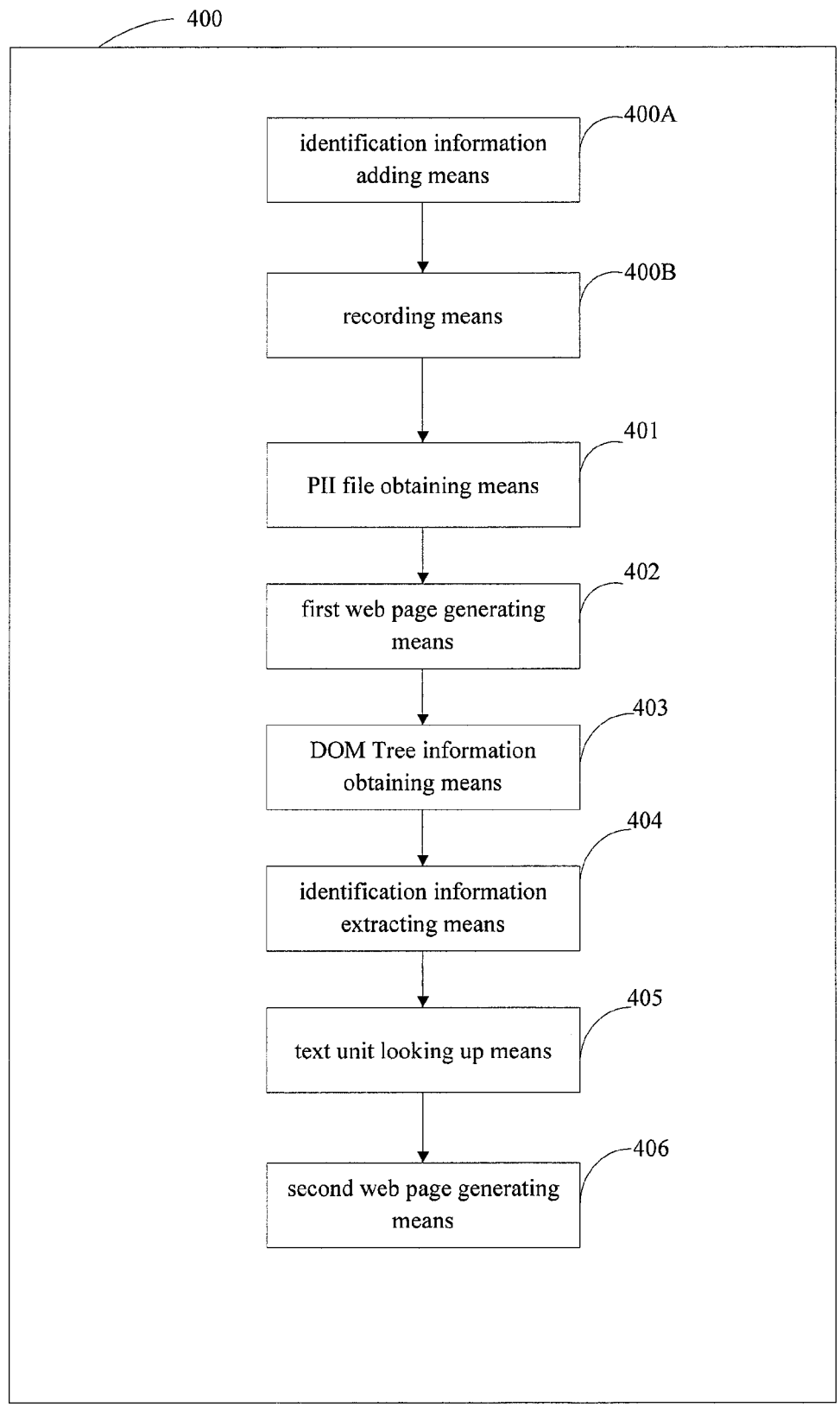
FIG. 4 depicts a schematic diagram of a system for verifying text translation in a program according to another embodiment of the invention.

FIG. 4 depicts a schematic diagram of a system for verifying text translation in a program according to another embodiment of the invention. The overall system shown in FIG. 4 is represented by a system 400. Specifically, the system 400 includes an identification information adding means 400A for adding identification information for the text unit in the first PII file of text in a program. The system 400 additionally includes a recording means 400B for recording the correspondence relationship between the added identification information and the text unit in the first PII file. Other means 401-406 correspond to blocks 101-106 in the method shown in FIG. 1.

Figure 5:
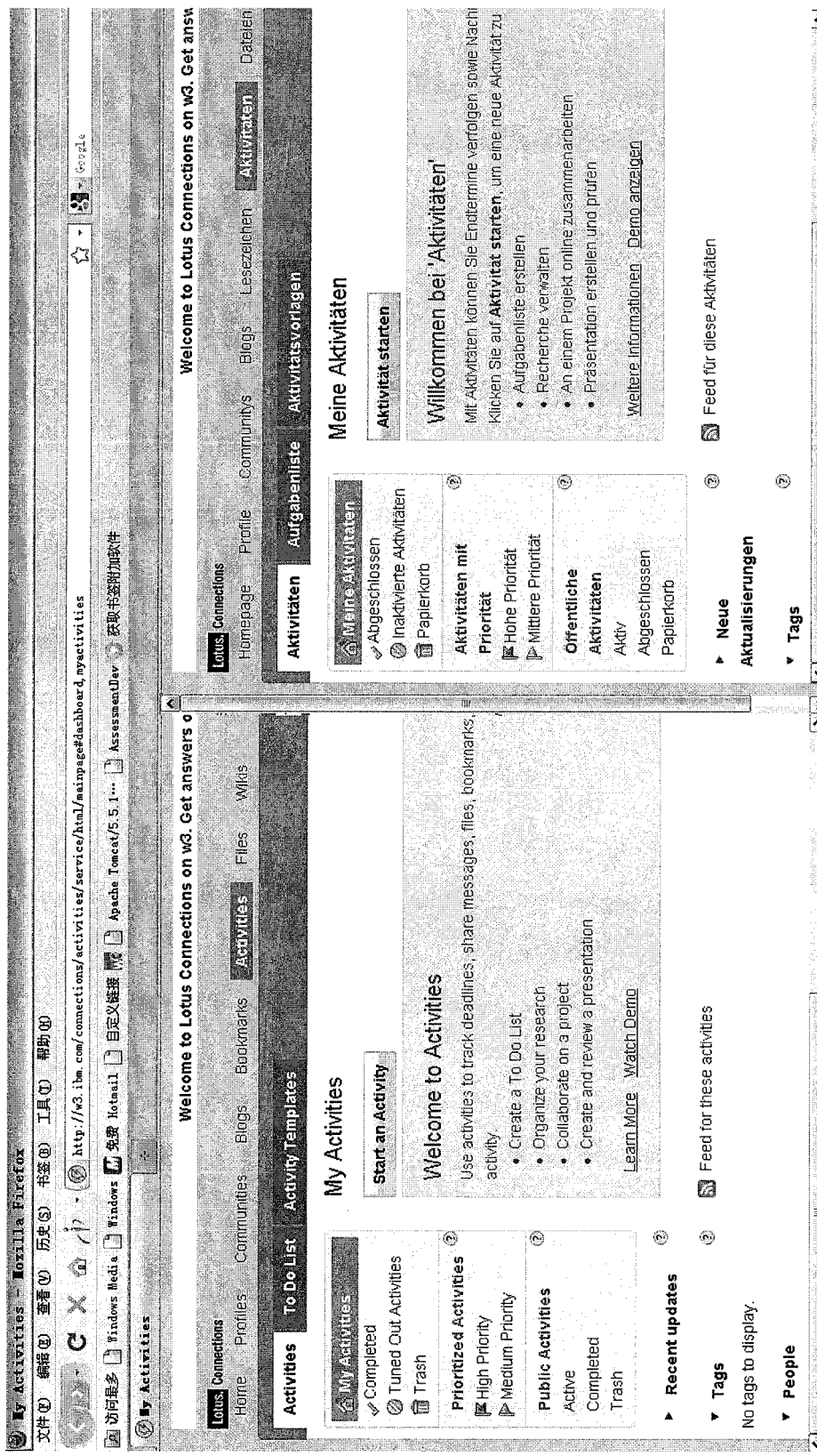
FIG. 5 depicts an example graphical user interface used for verifying text translation in a program according to one embodiment of the invention.

FIG. 5 depicts the pages used for verifying the text translation in an application program according to one embodiment of the invention. In FIG. 5, the left side is a page presentation in an English version, while the right side is the same page presentation in a German version. The two pages of FIG. 5 are generated using two PII files but by only building one instance of the application program. The two PII files are an English PII file and a German PII file.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The invention claimed is:

1. A method for verifying text translation in a program, the method comprising:
   obtaining a first program integrated information (PII) file and a second PII file of text in the program;
   executing, on a processor, the program using the first PII file to generate an original page;
   obtaining document object model (DOM) tree information of the original page;
   for each text unit in the original page performing:
      extracting identification information corresponding to a first text unit in the first PII file from the DOM tree information;
      looking up in the second PII file, a second text unit corresponding to the first text unit, the second text unit identified in the second PII file using the extracted identification information and a correspondence relationship between the extracted identification information and the second text unit; and
      replacing the first text unit in the DOM tree information with the second text unit; and
      generating a new page with each of the text units in the original page replaced by corresponding text units in the second PII file.

2. The method according to claim 1, wherein the first PII file is an original PII file, and the second PII file is a PII file translated from the original PII file.

3. The method according to claim 2, further comprising:
   adding identification information to one or more text units in the first PII file; and
   recording a correspondence relationship between the added identification information and the one or more text units in the first PII file.

4. The method according to claim 1, wherein the second PII file is an original PII file, and the first PII file is a PII file translated from the original PII file.

5. The method according to claim 1, wherein the extracted identification information is not displayed in a graphical user interface (GUI), the GUI displaying one or more of the original page and the new page.

6. The method according to claim 1, each of the text units in the first PII file has unique identification information.

7. The method according to claim 1, further comprising:
   listening for node property changing information in the DOM tree information of the original page; and
   updating the new page of the second PII file according to the node property changing information.

8. A system for verifying text translation in a program, the system comprising:
   a processor configured for executing instructions to perform a method comprising:
      obtaining a first program integrated information (PII) file and a second PII file of text in the program from a computer readable medium;
      executing the program using the first PII file to generate an original page;
      obtaining document object model (DOM) tree information of the original page;
      for each text unit in the original page:
         extracting identification information corresponding to a first text unit in the first PII file from the DOM tree information;
         looking up in the second PII file, a second text unit corresponding to the first text unit, the second text unit identified in the second PII file using the extracted identification information and a correspondence relationship between the extracted identification information and the second text unit; and
         replacing the first text unit in the DOM tree information with the second text unit; and
         generating a new page with each of the text units in the original page replaced by corresponding text units in the second PII file.

9. The system according to claim 8, wherein the first PII file is an original PII file, and the second PII file is a PII file translated from the original PII file.

10. The system according to claim 9, wherein the method further comprises:
    adding identification information to one or more text units in the first PII file; and
    recording a correspondence relationship between the added identification information and the one or more text units in the first PII file.

11. The system according to claim 8, wherein the second PII file is an original PII file, and the first PII file is a PII file translated from the original PII file.

12. The system according to claim 8, wherein the identification information is not displayed in a graphical user interface, the graphical user interface displaying one or more of the original page and the new page.

13. The system according to claim 8, each of the text units in the first PII file has unique identification information.

14. The system according to claim 8, wherein method further comprises:
    listening for node property changing information in the DOM tree information of the original page; and updating the new page of the second PII file according to the node property changing information.

15. A computer program product for verifying text translation in a program, the computer program product comprising:
    a non-transitory computer readable storage medium having computer readable program code embodied therewith, the computer readable program code comprising:
    computer readable program code configured to:
        obtain a first program integrated information (PII) file and a second PII file of text in the program from the non-transitory computer readable storage medium;
        execute the program using the first PII file to generate an original page;
        obtain document object model (DOM) tree information of the original page;
        for each text unit in the original page:
            extract identification information corresponding to a first text unit in the first PII file from the DOM tree information;
            look up in the second PII file, a second text unit corresponding to the first text unit, the second text unit identified in the second PII file using the extracted identification information and a correspondence relationship between the extracted identification information and the second text unit; and
            replace the first text unit in the DOM tree information with the second text unit; and
            generate a new page with each of the text units in the original page replaced by corresponding text units in the second PII file.

16. The computer program product according to claim 15, wherein the first PII file is an original PII file, and the second PII file is a PII file translated from the original PII file.

17. The computer program product according to claim 16, wherein the computer readable program code is configured to:
    add identification information to one or more text units in the first PII file; and
    record a correspondence relationship between the added identification information and the one or more text units in the first PII file.

18. The computer program product according to claim 15, wherein the second PII file is an original PII file, and the first PII file is a PII file translated from the original PII file.

19. The computer program product according to claim 15, wherein the identification information is not displayed in a graphical user interface, the graphical user interface displaying one or more of the original page and the new page.

20. The computer program product according to claim 15, wherein the computer readable program code is further configured to:
    listen for node property changing information in the DOM tree information of the original page; and
    update the new page of the second PII file according to the node property changing information.

* * * * *